(12) United States Patent
VanGilder et al.

(10) Patent No.: US 8,554,515 B2
(45) Date of Patent: *Oct. 8, 2013

(54) SYSTEM AND METHOD FOR PREDICTING COOLING PERFORMANCE OF ARRANGEMENTS OF EQUIPMENT IN A DATA CENTER

(75) Inventors: James W. VanGilder, Pepperell, MA (US); Xuanhang Zhang, Tewksbury, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,881

(22) Filed: Aug. 20, 2012

(65) Prior Publication Data

US 2013/0073258 A1    Mar. 21, 2013

Related U.S. Application Data

(63) Continuation of application No. 12/437,746, filed on May 8, 2009, now Pat. No. 8,249,825.

(51) Int. Cl.
*G06F 11/30*  (2006.01)
*G06F 7/60*  (2006.01)
*G21C 17/00*  (2006.01)
*H05K 7/20*  (2006.01)

(52) U.S. Cl.
USPC ............... 702/182; 702/130; 703/2; 361/688

(58) Field of Classification Search
USPC .................. 702/130, 182; 703/2; 361/688
See application file for complete search history.

(56) References Cited

U.S. PATENT DOCUMENTS

| 4,823,290 A | 4/1989 | Fasack et al. |
| 4,827,151 A | 5/1989 | Okado |
| 4,962,734 A | 10/1990 | Jorgensen |
| 5,462,225 A | 10/1995 | Massara et al. |
| 5,581,478 A | 12/1996 | Cruse et al. |

(Continued)

FOREIGN PATENT DOCUMENTS

| WO | 03081406 A1 | 10/2003 |
| WO | 2006/034718 A1 | 4/2006 |

(Continued)

OTHER PUBLICATIONS

"Case Study, Application of TileFlow to Improve Cooling in a Data Center," Innovative Research, Inc., 2004.

(Continued)

*Primary Examiner* — Alexander H Taningco
*Assistant Examiner* — L. Anderson
(74) *Attorney, Agent, or Firm* — Lando & Anastasi, LLP

(57) ABSTRACT

A system and method for evaluating equipment in an improper cluster in a data center, the equipment including a plurality of equipment racks, and at least one cooling provider. In one aspect, the method includes receiving data regarding each of the plurality of equipment racks and the at least one cooling provider, the data including a layout of the improper cluster of equipment racks and the at least one cooling provider, storing the received data, identifying at least one gap in the layout, determining cooling performance of at least one of the plurality of equipment racks based, at least in part, on characteristics of the at least one gap, and displaying the layout of the data center, wherein the layout includes an indication of the cooling performance of the at least one of the plurality of equipment racks.

20 Claims, 4 Drawing Sheets

(56) References Cited

U.S. PATENT DOCUMENTS

| | | | |
|---|---|---|---|
| 5,657,641 A | 8/1997 | Cunningham et al. |
| 5,682,949 A | 11/1997 | Ratcliffe et al. |
| 5,850,539 A | 12/1998 | Cook et al. |
| 5,995,729 A | 11/1999 | Hirosawa et al. |
| 6,134,511 A | 10/2000 | Subbarao |
| 6,216,956 B1 | 4/2001 | Ehlers et al. |
| 6,246,969 B1 | 6/2001 | Sinclair et al. |
| 6,347,627 B1 | 2/2002 | Frankie et al. |
| 6,374,627 B1 | 4/2002 | Schumacher et al. |
| 6,459,579 B1 | 10/2002 | Farmer et al. |
| 6,574,104 B2 | 6/2003 | Patel et al. |
| 6,672,955 B2 | 1/2004 | Charron |
| 6,694,759 B1 | 2/2004 | Bash et al. |
| 6,714,977 B1 | 3/2004 | Fowler et al. |
| 6,718,277 B2 | 4/2004 | Sharma |
| 6,721,672 B2 | 4/2004 | Spitaels et al. |
| 6,745,579 B2 | 6/2004 | Spinazzola et al. |
| 6,795,928 B2 | 9/2004 | Bradley et al. |
| 6,804,616 B2 | 10/2004 | Bodas |
| 6,819,563 B1 | 11/2004 | Chu et al. |
| 6,859,366 B2 | 2/2005 | Fink |
| 6,862,179 B2 | 3/2005 | Beitelmal et al. |
| 6,881,142 B1 | 4/2005 | Nair |
| 6,886,353 B2 | 5/2005 | Patel et al. |
| 6,964,539 B2 | 11/2005 | Bradley et al. |
| 6,967,283 B2 | 11/2005 | Rasmussen et al. |
| 7,020,586 B2 | 3/2006 | Snevely |
| 7,031,870 B2 | 4/2006 | Sharma et al. |
| 7,051,946 B2 | 5/2006 | Bash et al. |
| 7,085,133 B2 | 8/2006 | Hall |
| 7,155,318 B2 | 12/2006 | Sharma et al. |
| 7,173,820 B2 | 2/2007 | Fink et al. |
| 7,197,433 B2 | 3/2007 | Patel et al. |
| 7,251,547 B2 | 7/2007 | Bash et al. |
| 7,313,503 B2 | 12/2007 | Nakagawa et al. |
| 7,315,448 B1 | 1/2008 | Bash et al. |
| 7,366,632 B2 | 4/2008 | Hamann et al. |
| 7,403,391 B2 | 7/2008 | Germagian et al. |
| 7,426,453 B2 | 9/2008 | Patel et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,620,480 B2 | 11/2009 | Patel et al. |
| 7,676,280 B1 | 3/2010 | Bash et al. |
| 7,726,144 B2 | 6/2010 | Larson et al. |
| 7,881,910 B2 | 2/2011 | Rasmussen et al. |
| 7,885,795 B2 | 2/2011 | Rasmussen et al. |
| 7,979,250 B2 | 7/2011 | Archibald et al. |
| 7,991,592 B2 | 8/2011 | VanGilder et al. |
| 8,155,922 B2 | 4/2012 | Loucks |
| 8,219,362 B2 | 7/2012 | Shrivastava et al. |
| 8,229,713 B2 | 7/2012 | Hamann et al. |
| 8,249,825 B2 | 8/2012 | VanGilder et al. |
| 8,315,841 B2 | 11/2012 | Rasmussen et al. |
| 2001/0042616 A1 | 11/2001 | Baer |
| 2002/0059804 A1 | 5/2002 | Spinazzola et al. |
| 2002/0072868 A1 | 6/2002 | Bartone et al. |
| 2003/0115000 A1 | 6/2003 | Bodas |
| 2003/0115024 A1 | 6/2003 | Snevely |
| 2003/0147216 A1 | 8/2003 | Patel et al. |
| 2003/0158718 A1 | 8/2003 | Nakagawa et al. |
| 2003/0196126 A1 | 10/2003 | Fung |
| 2004/0020224 A1 | 2/2004 | Bash et al. |
| 2004/0065097 A1 | 4/2004 | Bash et al. |
| 2004/0065104 A1 | 4/2004 | Bash et al. |
| 2004/0075984 A1 | 4/2004 | Bash et al. |
| 2004/0083012 A1 | 4/2004 | Miller |
| 2004/0089009 A1 | 5/2004 | Bash et al. |
| 2004/0089011 A1 | 5/2004 | Patel et al. |
| 2004/0099747 A1 | 5/2004 | Johnson et al. |
| 2004/0163001 A1 | 8/2004 | Bodas |
| 2004/0240514 A1 | 12/2004 | Bash et al. |
| 2004/0262409 A1 | 12/2004 | Crippen et al. |
| 2005/0016189 A1 | 1/2005 | Wacker |
| 2005/0023363 A1 | 2/2005 | Sharma et al. |
| 2005/0108582 A1 | 5/2005 | Fung |
| 2005/0225936 A1 | 10/2005 | Day |
| 2005/0228618 A1 | 10/2005 | Patel et al. |
| 2005/0267639 A1 | 12/2005 | Sharma et al. |
| 2006/0080001 A1 | 4/2006 | Bash et al. |
| 2006/0112286 A1 | 5/2006 | Whalley et al. |
| 2006/0121421 A1 | 6/2006 | Spitaels et al. |
| 2006/0139877 A1 | 6/2006 | Germagian et al. |
| 2006/0168975 A1 | 8/2006 | Malone et al. |
| 2006/0214014 A1 | 9/2006 | Bash et al. |
| 2007/0038414 A1 | 2/2007 | Rasmussen et al. |
| 2007/0076373 A1 | 4/2007 | Fink |
| 2007/0078635 A1 | 4/2007 | Rasmussen et al. |
| 2007/0150215 A1 | 6/2007 | Spitaels et al. |
| 2007/0165377 A1 | 7/2007 | Rasmussen et al. |
| 2007/0174024 A1 | 7/2007 | Rasmussen et al. |
| 2007/0213000 A1 | 9/2007 | Day |
| 2007/0274035 A1 | 11/2007 | Fink et al. |
| 2008/0041076 A1 | 2/2008 | Tutunoglu et al. |
| 2008/0104985 A1 | 5/2008 | Carlsen |
| 2008/0105412 A1 | 5/2008 | Carlsen et al. |
| 2008/0174954 A1 | 7/2008 | VanGilder et al. |
| 2009/0030554 A1 | 1/2009 | Bean, Jr. et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0205416 A1 | 8/2009 | Campbell et al. |
| 2009/0223234 A1 | 9/2009 | Campbell et al. |
| 2009/0259343 A1 | 10/2009 | Rasmussen et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0106464 A1 | 4/2010 | Hlasny et al. |
| 2010/0211669 A1 | 8/2010 | Dalgas et al. |
| 2010/0211810 A1 | 8/2010 | Zacho |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |
| 2011/0246147 A1 | 10/2011 | Rasmussen et al. |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2013/0006426 A1 | 1/2013 | Healey et al. |

FOREIGN PATENT DOCUMENTS

| | | |
|---|---|---|
| WO | 2006119248 A2 | 11/2006 |
| WO | 2006124240 A2 | 11/2006 |
| WO | 2007095144 A2 | 8/2007 |
| WO | 2008144375 A2 | 11/2008 |
| WO | 2009/014893 A1 | 1/2009 |
| WO | 2011/019615 A1 | 2/2011 |

OTHER PUBLICATIONS

"Management Strategy for Network Critical Physical Infrastructure", White Paper #100, pp. 110, American Power Conversion, Dec. 15, 2003, published on World Wide Web.

Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238, XP019499843, ISSN: 1573-7578.

Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

APC User's Guide Brochure, "InfraStruXure Manager," Mar. 2004, 181 pgs.

ASHRAE, "Thermal Guidelines for Data Processing Environments" 2004, Atlanta: American Society of Heating, Refrigerating, and Air-Conditioning Engineers, Inc., 2004, Atlanta.

Bash, C. E. et al.: "Balance of Power: Dynamic Thermal Management for Internet Data Centers", IEEE Internet Computing, Jan. 1, 2005, pp. 42-49, vol. 9, No. 1, IEEE Service Center, New York, NY.

Bash, C.E., Patel, C.D., and Sharma, R.K., "Efficient Thermal Management of Data Centers—Immediate and Long-Term Research

(56) References Cited

OTHER PUBLICATIONS

Needs" Intl. J. Heat, Ventilating, Air-Conditioning and Refrigeration Research, 2003, pp. 137-152, vol. 9, No. 2.

Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s1 0619-005-0413-0.

Chandrakant D. Patel, et al., "Thermal Considerations in Cooling Large Scale High Copute Density Data Centers" IEEE 2002, pp. 767-776.

Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Ehsan Pakabaznia et al., "Miminizing data center cooling and server power costs", Proceedings of the 14th ACM/IEEE International Symposium on Low Power Electronics and Design, ISLPED '09, Jan. 1, 2009, p. 145, XP55015368, New York, New York, USA, DOI: 10.1145/1594233.1594268, ISBN: 978-1-60-558684-7.

Herrlin, M.K., "Rack Cooling Effectiveness in Data Centers and Telecom Central Offices: The Rack Cooling Index (RCI)," ASHRAE Transaction, 2005, pp. 725-731, vol. 111(2).

Innovative Research, Inc., http://web.archive.org/web/20051221005029/http://www.inres.com/, Dec. 21, 2005, published on World Wide Web.

International Search Report and Written Opinion from corresponding International Application No. PCT/US2011/052561, dated Dec. 27, 2011.

International Search Report for PCT/US2006/16739 mailed Oct. 3, 2006.

International Search Report for PCT/US2008/051908 mailed Jul. 3, 2008.

International Search Report for PCT/US2009/065700 mailed Feb. 18, 2010.

International Search Report for PCT/US2010/033867 mailed Jul. 7, 2010.

International Search Report for PCT/US2010/033876 mailed Jul. 1, 2010.

International Search Report for PCT/US2011/051866 mailed Feb. 24, 2012.

International Search Report for PCT/US2012/030373 mailed Aug. 14, 2012.

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007, pp. 193-225, XP019499845, ISSN: 1573-7578, DOI:10.1007/S10619-006-7007-3.

Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008, pp. 1129-1142, ISSN: 0018-9340, DOI: 10.1109/TC.2008.52.

K. Dunlap, "Cooling Audit for Identifying Potential Cooling Problems in Data Centers", White Paper #40, pp. 1-18, American Power Conversion, May 20, 2004, published on World Wide Web.

N. Rasmussen, "Calculating Total Cooling Requirements for Data Centers", White Paper #25, pp. 1-8, American Power Conversion, May 20, 2004, published on World Wide Web.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

Neil Rasmussen, "Air Distribution Architecture Options for Mission Critical Facilities," White Paper #55, Revision 1, 2003 American Power Conversion, Rev 2003-0, pp. 1-13.

Neil Rasmussen, "Avoidable Mistakes that Compromise Cooling Performance in Data Centers and Network Rooms,"White Paper #49, 2003 American Power Conversion, Rev 2003-0, pp. 1-15.

Neil Rasmussen, "Cooling Options for Rack Equipment with Side-to-Side Airflow," White Paper #50, 2004 American Power Conversion, Rev 2004-0, pp. 1-14.

Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000, pp. 90-98, ISBN: 978-0-7803-5912-3.

Sharma, R.K, Bash, C.E, and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009, pp. 785-791.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009, pp. 41-50, DOI: 10.1115/IMECE2009-10806, ISBN: 978-0-7918-4386-4.

Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010, pp. 1-8, XP031702357.

VanGilder et al., "Airflow Uniformity thourhg Perforated Tiles in a Raised-Floor Data Center", White Paper 121, Jul. 17-22, 2005, 10 pages.

VanGilder, James W. et al., "Capture index: an airflow-based rack cooling performance metric," 2007, ASHRAE Transactions, vol. 113, pp. 126-136.

VanGilder, James W. et al., "Real-Time prediction of rack-cooling performance," 2006, ASHRAE Transactions, vol. 112, pp. 151-162.

SYSTEM AND METHOD FOR PREDICTING COOLING PERFORMANCE OF ARRANGEMENTS OF EQUIPMENT IN A DATA CENTER

RELATED APPLICATIONS

This application claims the benefit under 35 U.S.C. §120 of U.S. application Ser. No. 12/437,746, entitled "SYSTEM AND METHOD FOR PREDICTING COOLING PERFORMANCE OF ARRANGEMENTS OF EQUIPMENT IN A DATA CENTER," filed on May 8, 2009, and issued on Aug. 21, 2012, as U.S. Pat. No. 8,249,825, which is herein incorporated by reference in its entirety.

BACKGROUND

1. Field of the Invention

At least one embodiment in accordance with the present invention relates generally to systems and methods for data center management and design, and more specifically, to systems and methods for predicting cooling performance of arrangements of equipment in a data center, including improper clusters of equipment in a data center.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed of specialized enclosures termed "racks" which integrate these connectivity, power and cooling elements. In some data center configurations, these rows are organized into hot and cold aisles to decrease the cost associated with cooling the information technology equipment. These characteristics make data centers a cost effective way to deliver the computing power required by many software applications.

Various processes and software applications, such as the InfrastruXure® Central product available from American Power Conversion Corporation of West Kingston, R.I., have been developed to aid data center personnel in designing and maintaining efficient and effective data centers configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY OF THE INVENTION

A first aspect of the invention is directed to a computer-implemented method for evaluating equipment in an improper cluster in a data center, the equipment including a plurality of equipment racks, and at least one rack-based cooling provider. The method includes receiving data regarding each of the plurality of equipment racks and the at least one cooling provider, the data including a layout of the improper cluster of equipment racks and the at least one cooling provider, storing the received data, identifying at least one gap in the layout, determining cooling performance of at least one of the plurality of equipment racks based, at least in part, on characteristics of the at least one gap, and displaying the layout of the data center, wherein the layout includes an indication of the cooling performance of the at least one of the plurality of equipment racks.

In the method, determining cooling performance of the at least one of the plurality of equipment racks may include determining capture index for the at least one of the plurality of equipment racks, and the method may further include determining capture index for each of the plurality of equipment racks based, at least in part, on characteristics of the at least one gap. In the method, determining capture index may include determining airflow through the at least one gap, and determining airflow may include determining airflow out of an aisle of the improper cluster through the at least one gap, and determining airflow into the aisle through the at least one gap. Further, determining cooling performance of the at least one of the plurality of equipment racks may include determining a value for capture index for the at least one of the plurality of equipment racks with each gap in the layout modeled as a blank panel. The method may further include determining a corrector value based on characteristics of the at least one gap, and applying the corrector value to the value for capture index for the at least one of the plurality of equipment racks. The method may also include positioning the equipment in the data center in accordance with the layout.

Another aspect of the invention is directed to a system for evaluating equipment in an improper cluster in a data center, the equipment including a plurality of equipment racks, and at least one rack-based cooling provider. The system includes an interface, and a controller configured to receive data regarding each of the plurality of equipment racks and the at least one cooling provider, the data including a layout of the improper cluster of equipment racks and the at least one cooling provider, store the received data in the system, identify at least one gap in the layout, and determine cooling performance of at least one of the plurality of equipment racks based, at least in part, on characteristics of the at least one gap.

The system may further include a display coupled to the controller, and the controller may be further configured to display the layout of the data center, wherein the layout includes an indication of the cooling performance of the at least one of the plurality of equipment racks. The controller may be further configured to determine capture index for the at least one of the plurality of equipment racks based, at least in part, on characteristics of the at least one gap. In the system, the controller may be configured to determine airflow out of an aisle of the improper cluster through the at least one gap, and determine airflow into the aisle through the at least one gap. The controller may be further configured to determine a value for capture index for the at least one of the plurality of equipment racks with each gap in the layout modeled as a blank panel. Further, the controller may be configured to determine a corrector value based on characteristics of the at least one gap, and apply the corrector value to the value for capture index for the at least one of the plurality of equipment racks.

Another aspect of the invention is directed to a computer readable medium having stored thereon sequences of instruction including instructions that will cause a processor to receive data regarding a layout of an improper cluster of equipment racks and at least one cooling provider, store the received data, identify at least one gap in the layout, and determine cooling performance of at least one of the plurality of equipment racks based, at least in part, on characteristics of the at least one gap.

The sequences of instruction may further include instructions that will cause the processor to display the layout of the data center on a display associated with the processor, wherein the layout includes an indication of the cooling performance of the at least one of the plurality of equipment racks. The medium may also include instructions that will cause the processor to determine capture index for the at least one of the plurality of equipment racks based, at least in part, on characteristics of the at least one gap. The sequences of instruction may further include instructions that will cause the processor to determine airflow through the at least one gap, including airflow out of an aisle of the improper cluster through the at least one gap, and determine airflow into the aisle through the at least one gap. The sequences of instruction may also include instructions that will cause the processor to determine a value for capture index for the at least one of the plurality of equipment racks with each gap in the layout modeled as a blank panel, and the sequences of instruction may further include instructions that will cause the processor to determine a corrector value based on characteristics of the at least one gap, and apply the corrector value to the value for capture index for the at least one of the plurality of equipment racks.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
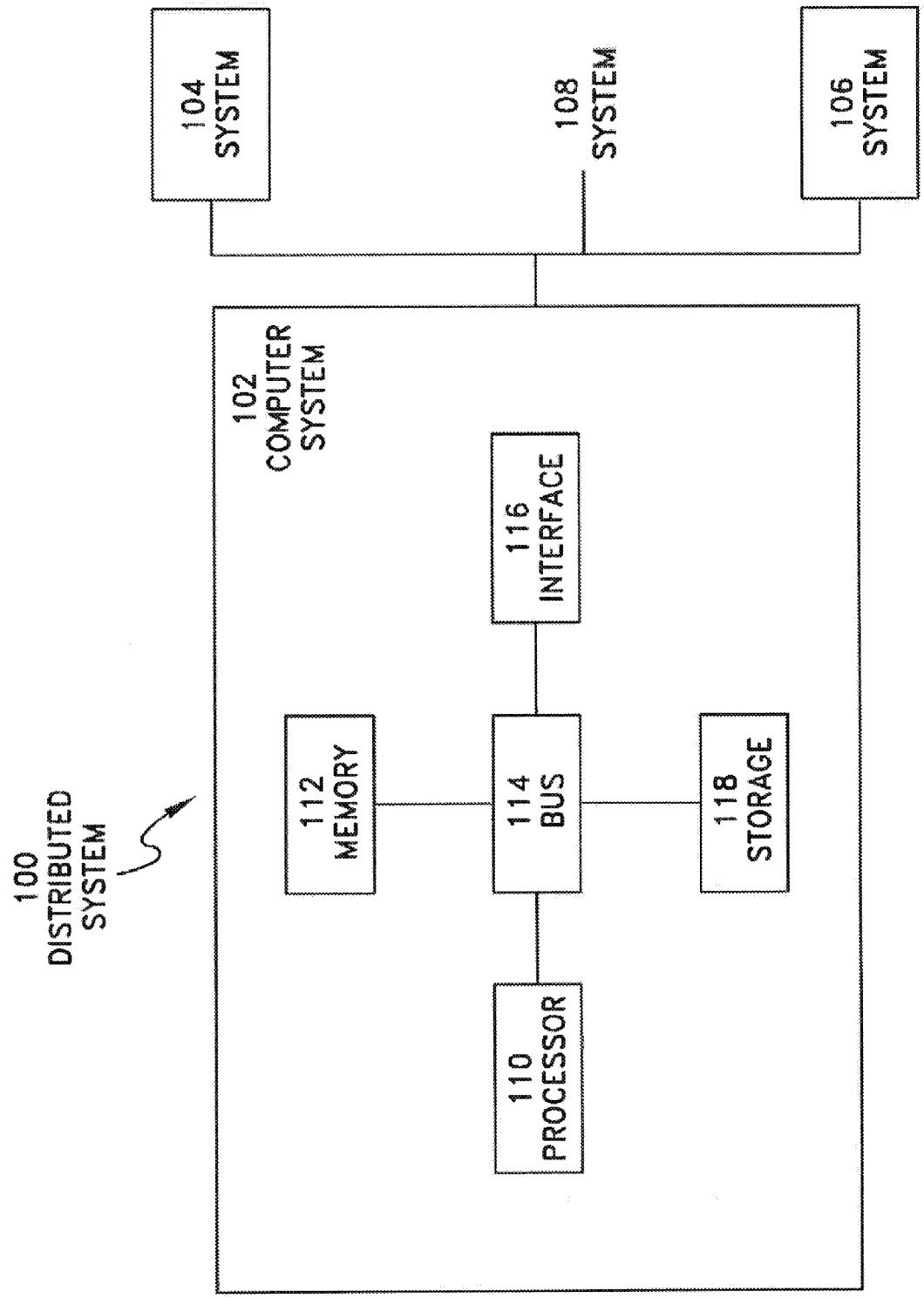
FIG. 1 shows an example computer system with which various aspects in accord with the present invention may be implemented.

At least some embodiments in accordance with the present invention relate to systems and processes through which a user may design data center configurations. These systems may facilitate this design activity by allowing the user to create models of data center configurations from which performance metrics may be determined. Both the systems and the user may employ these performance metrics to determine alternative data center configurations that meet various design objectives. Further, in at least one embodiment, a system will provide an initial layout of data center equipment and conduct a cooling analysis on the layout in real time.

As described in U.S. patent application Ser. No. 12/019, 109, titled "System and Method for Evaluating Equipment Rack Cooling", filed Jan. 24, 2008 (referred to herein as "the '109 Application"), and in U.S. patent application Ser. No. 11/342,300, titled "Methods and Systems for Managing Facility Power and Cooling" filed Jan. 27, 2006 (referred to herein as "the '300 application"), both of which are assigned to the assignee of the present application, and both of which are hereby incorporated herein by reference in their entirety, typical equipment racks in modern data centers draw cooling air in the front of the rack and exhaust air out the rear of the rack. The equipment racks, and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool aisle cluster, and adjacent rows of equipment racks separated by a hot aisle may be referred to as a hot aisle cluster. As readily apparent to one of ordinary skill in the art, a row of equipment racks may be part of one hot aisle cluster and one cool aisle cluster. In descriptions and claims herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

In typical prior methods and systems for designing and analyzing the layout of clusters in a data center, the methods and systems are either limited for use with simple clusters having two equal-length rows and no gaps or openings in the rows, or if not limited to simple clusters, involve the use of complex algorithms that typically cannot be performed in real-time. In data centers, there are many equipment groupings that have unequal row length or contain gaps and are not proper clusters easily analyzed by prior techniques. For at least one embodiment, an improper cluster is defined herein as including a two-row grouping of racks, and potentially coolers, around a common cool or hot aisle in which there are gaps in the rows or unequal-length rows. A single row may constitute an improper cluster. A continuous break between equipment in a row greater than three feet may constitute a break in the row and the row may be divided into multiple proper and improper clusters, or considered to be one improper cluster.

In at least one embodiment, a method is provided for predicting the cooling performance of an improper cluster in a data center in real-time. The method may be incorporated in a system having capabilities for predicting the cooling performance of proper clusters and for performing other design and analysis functions of equipment in a data center.

The aspects disclosed herein in accordance with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center configurations. Further, computer systems in embodiments of the data center may be used to automatically measure environmental parameters in a data center, and control equipment, such as chillers or coolers to optimize performance. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present invention may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accordance with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copies the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accordance with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present invention may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used. Further, in at least one embodiment, the tool may be implemented using VBA Excel.

A computer system included within an embodiment may perform additional functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
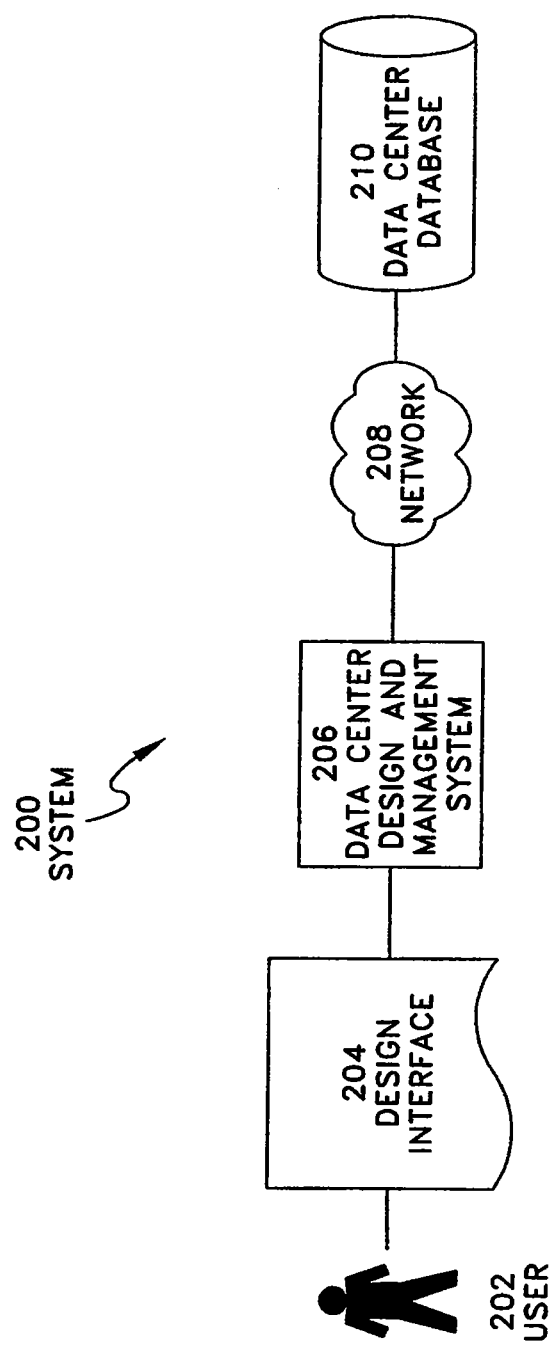
FIG. 2 illustrates an example distributed system including an embodiment.

FIG. 2 presents a context diagram including physical and logical elements of distributed system 200. As shown, distributed system 200 is specially configured in accordance with the present invention. The system structure and content recited with regard to FIG. 2 is for exemplary purposes only and is not intended to limit the invention to the specific structure shown in FIG. 2. As will be apparent to one of ordinary skill in the art, many variant system structures can be architected without deviating from the scope of the present invention. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information required to support the features and functions of data center design and management system 206. For example, in one embodiment, data center database 210 may include at least some portion of the data stored in the data center equipment database described in PCT/US08/63675. In another embodiment, this information may include any information required to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store types of cooling providers, the amount of cool air provided by each type of cooling provider, and a temperature of cool air provided by the cooling provider. Thus, for example, data center database 210 includes records of a particular type of CRAC unit that is rated to deliver airflow at the rate of 5,600 cfm at a temperature of 68 degrees Fahrenheit. In addition, the data center database 210 may store one or more cooling metrics, such as inlet and outlet temperatures of the CRACs and inlet and outlet temperatures of one or more equipment racks. The temperatures may be periodically measured and input into the system, or in other embodiments, the temperatures may be continuously monitored using devices coupled to the system 200.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Figure 3:
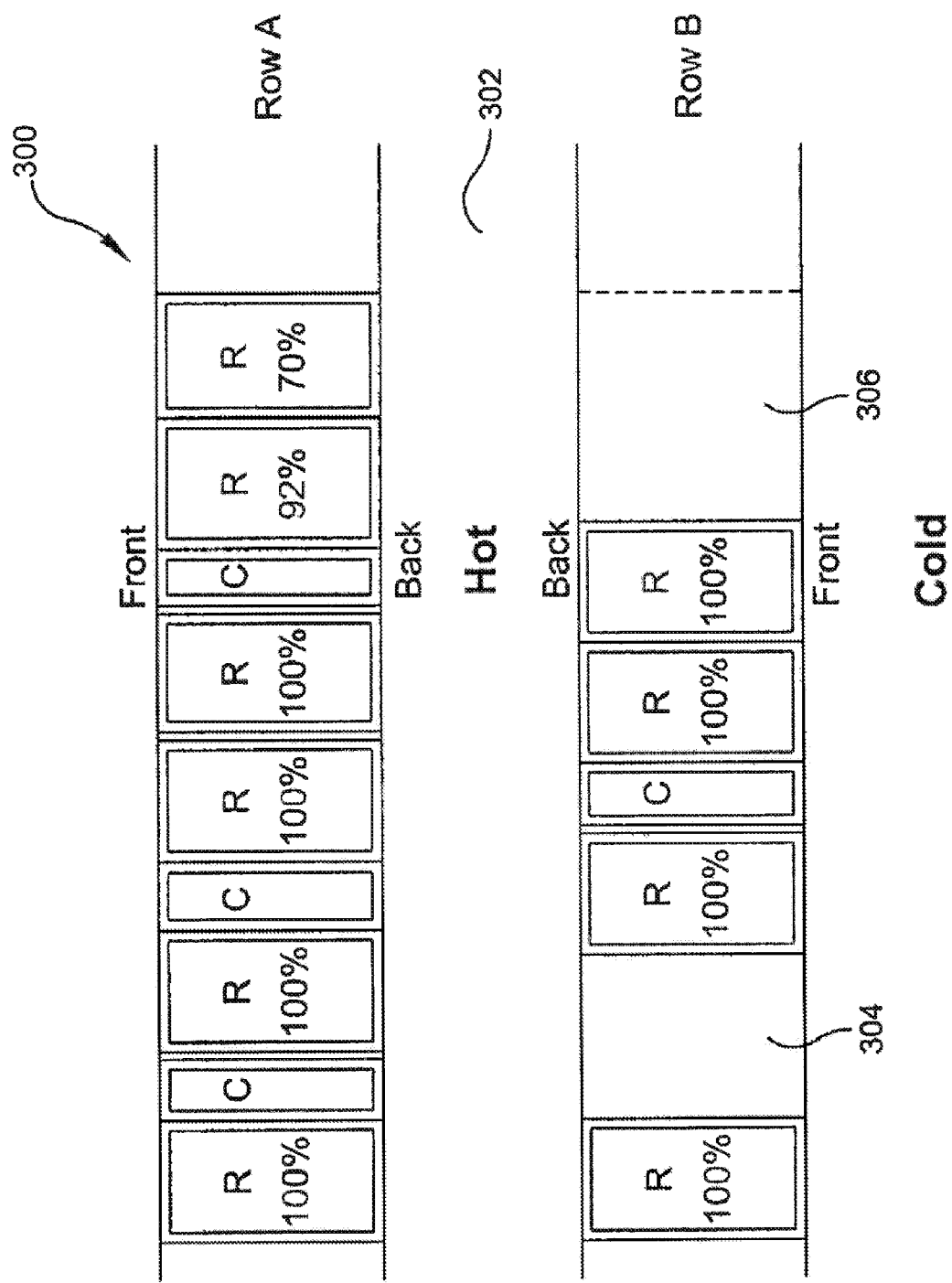
FIG. 3 shows a layout of an improper cluster of data equipment racks and coolers.

In at least one embodiment, which will now be described, a tool is provided that predicts cooling performance for an improper hot aisle cluster in real time and displays results of the prediction along with a model of the improper cluster. FIG. 3 shows a model of an improper cluster of racks 300. The improper cluster includes two rows of racks A and B separated by a hot aisle 302. Each row includes racks R and coolers C. Row A includes 6 racks and 3 coolers and Row B includes 4 racks and 1 cooler. Row B also includes two gaps 304 and 306. In one embodiment, the racks are standard nineteen inch equipment racks having an overall width of 24 inches and the coolers have a width of 12 inches. However, embodiments of the invention may be used with racks and coolers of other sizes. Gap 304 is approximately two feet wide and gap 306, representing a difference in lengths of the Rows A and B, is approximately 4 feet wide. As shown in FIG. 3, in accordance with some embodiments, the results of the prediction of cooling performance may be displayed directly on the racks in the model. In FIG. 3, the results are shown as capture index (in percentage) on each of the racks in the model.

In embodiments of the invention, different performance metrics can be used to evaluate the cooling performance of an improper cluster. In one embodiment, the performance metric is capture index. Capture index, and methods of determining capture index are described in greater detail in the '109 and '300 applications referenced above. The cold-aisle capture index for a rack is defined in at least some embodiments as the fraction of air ingested by the rack which originates from local cooling resources (e.g., perforated floor tiles or local coolers). The hot-aisle capture index is defined as the fraction of air exhausted by a rack which is captured by local extracts (e.g., local coolers or return vents). CI therefore varies between 0 and 100% with better cooling performance generally indicated by greater CI values. In a cold-aisle analysis, high CI's ensure that the bulk of the air ingested by a rack comes from local cooling resources rather than being drawn from the room environment or from air which may have already been heated by electronics equipment. In this case, rack inlet temperatures will closely track the perforated-tile airflow temperatures and, assuming these temperatures are within the desired range, acceptable cooling will be achieved. In a hot-aisle analysis, high CI's ensure that rack exhaust is captured locally and there is little heating of the surrounding room environment.

While good (high) CI values typically imply good cooling performance; low CI values do not necessarily imply unacceptable cooling performance. For example, in a rack in a raised-floor environment which draws most of its airflow from the surrounding room environment rather than from the perforated tiles, the rack's cold-aisle CI will be low; however, if the surrounding room environment is sufficiently cool, the rack's inlet temperature may still be acceptable. In this case, the rack's cooling needs are met by the external room environment rather than perforated tiles within the rack's cluster. If this process is repeated many times across the data center, facility cooling will be complex and may be unpredictable. High CI values lead to inherently scalable cluster layouts and more predictable room environments.

In one embodiment, a tool operable on one or more computer systems described above determines capture index for racks of an improper cluster. In doing so, the improper cluster is first analyzed as a proper cluster, with all gaps and any row-length mismatches filled with blanking panels (or "dummy" racks with zero airflow). The capture index is determined for each of the racks in the proper cluster using any of a number of techniques for determining the CI, including the algebraic, neural network and PDA-CFD techniques described in the '109 and '300 applications referenced above.

Once the CI is determined for the proper cluster, a corrector model is applied to the results to correct for the negative effects created by gaps in the improper cluster. Gaps in the rows of an improper cluster provide an opening to allow air to escape from the aisle between the two rows in a cluster having a negative effect on the capture index. The corrector model determines the percentage of reduction of the CI for each rack in the improper cluster. The final CI for a rack i in an improper cluster can be expressed as follows using equation (1):

$$CI_i^{gap} = CI_i^{blank} \cdot (1 - Corrector_i) \qquad \text{Equation (1)}$$

where, $CI_i^{blank}$ is the "benchmark" CI value for rack i when all the gaps and row length mismatches in the cluster are replaced by blanking panels.

$Corrector_i$ is the percentage reduction (expressed as a decimal value) of the CI of rack i.

In equations discussed herein, rack locations are designated as $A_i$ and $B_j$. The designation A or B indicates which row the rack is contained in and the subscript i or j indicates the slot in the row containing the rack, which may be counted from left or right. For example, in the cluster of FIG. 3, Row A includes 6 racks and 3 coolers for a total of 9 objects or 30 6-inch slots and Row B includes 4 racks, one cooler and two gaps for a totally of 7 objects or 30 6-inch slots.

The CI corrector is related to the distance between the rack of interest and all the gaps in the improper cluster where each 6-inch "slot" (in an open "gap section" like 304 or 306 of FIG. 3) is typically considered one gap. In one embodiment, the percentage reduction of the CI value of a certain rack at location $A_i$ can be adequately represented as follows:

$$Corrector_{Ai} = X \cdot \frac{\sum_{j}^{all\ gaps\ in\ row\ A} e^{-Y \cdot \Delta x(i,j)} + Z \cdot \sum_{j}^{all\ gaps\ in\ row\ B} e^{-Y \cdot \Delta x(i,j)}}{\sum_{j}^{all\ objects\ in\ row\ A} e^{-Y \cdot \Delta x(i,j)} + Z \cdot \sum_{j}^{all\ objects\ in\ row\ B} e^{-Y \cdot \Delta x(i,j)}} \quad \text{Equation (2)}$$

where, $Corrector_{Ai}$ is the percentage reduction (expressed as a decimal value) of the CI of rack i in Row A X, Y, and Z are empirical constants $\Delta x(i,j)$ is the horizontal distance between locations (slots) i and j.

In equation (2), the numerator is equal to zero when there are no gaps and hence the $Corrector_{Ai}$ becomes zero. In this case, the cluster is a proper cluster and no correction is needed. The closer a gap is to a rack, the larger the Corrector for that rack and hence the lower the CI of the rack. The empirical constants X, Y and Z can be determined by comparing the calculations for a large number of layouts to corresponding "benchmark" cases typically created by CFD simulation. The constants in the model are then adjusted to give the best overall agreement with the benchmark cases based on various metrics including CI.

The Corrector described herein can be applied to any type of improper cluster, which might include hot aisle improper clusters with row-based coolers and cold aisle improper clusters with row-based coolers and/or perforated tiles.

In one example, for hot aisle improper clusters with row-based coolers, constants X and Y are fixed for all cluster configurations, but constant Z varies with aisle width as shown in the table below. For a single-row improper cluster, Z is 2.

TABLE 1

Constants vs. Aisle Width for Hot Aisle Clusters with Row-Based Coolers

| Constant | Hot Aisle Width (ft) | | | |
|---|---|---|---|---|
|  | 3 | 4 | 5 | 6 |
| X | 1 | 1 | 1 | 1 |
| Y | 0.073 | 0.073 | 0.073 | 0.073 |
| Z | 3 | 2.33 | 1.67 | 1 |

In one example, for cold aisle improper clusters with row-based coolers, constants X and Y are fixed for all cluster configurations, but the constant Z varies with aisle width as shown in the table below. For a single row improper cluster, Z is 2.

TABLE 2

Constants vs. Aisle Width for Cold Aisle Clusters with Row-Based Coolers

| Constant | Cold Aisle Width (ft) | |
|---|---|---|
|  | 4 | 6 |
| X | 1 | 1 |
| Y | 0.123 | 0.123 |
| Z | 3 | 1 |

In one example, for cold aisle improper clusters with perforated tiles, constants X and Y are fixed for all cluster configurations, but constant Z varies with aisle width as shown in the table below. For a single row improper cluster, Z is 0.18.

TABLE 3

Constants vs. Aisle Width for Cold Aisle Clusters with Perforated Tiles

| Constant | Cold Aisle Width (ft) | |
|---|---|---|
|  | 4 | 6 |
| X | 1 | 1 |
| Y | 2.8 | 2.8 |
| Z | 0.1 | 0.05 |

In one example, for cold aisle improper clusters with both row-based coolers and perforated tiles, the calculation of constant X can be expressed as follows using equation (3):

$$X = \alpha \cdot X_{PT} + (1-\alpha) \cdot X_{IR} \quad \text{Equation (3)}$$

where, $X_{PT}$ is the constant X used in the cold-aisle-cluster-with-perforated-tiles applications for the same cold aisle width; $X_{IR}$ is the constant X used in the cold aisle cluster-with-row-based-coolers applications for the same cold aisle width; and $\alpha$ is the fraction of supply airflow delivered by the perforated tiles. Constants Y and Z are be determined in a similar manner.

It is noted that the effect of the presence of gaps on cooling performance is greater for layouts with row-based coolers than for raised floor applications due to the strong horizontal airflow patterns associated with row-based coolers.

Figure 4:
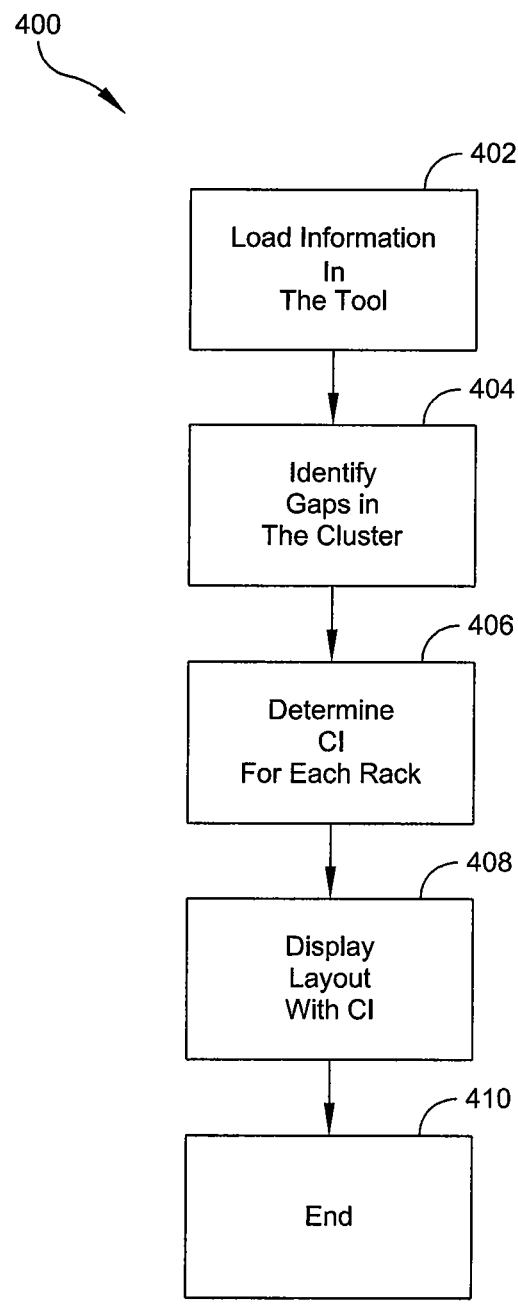
FIG. 4 shows a flowchart of a process for determining cooling characteristics in accordance with one embodiment.
Figure 1:
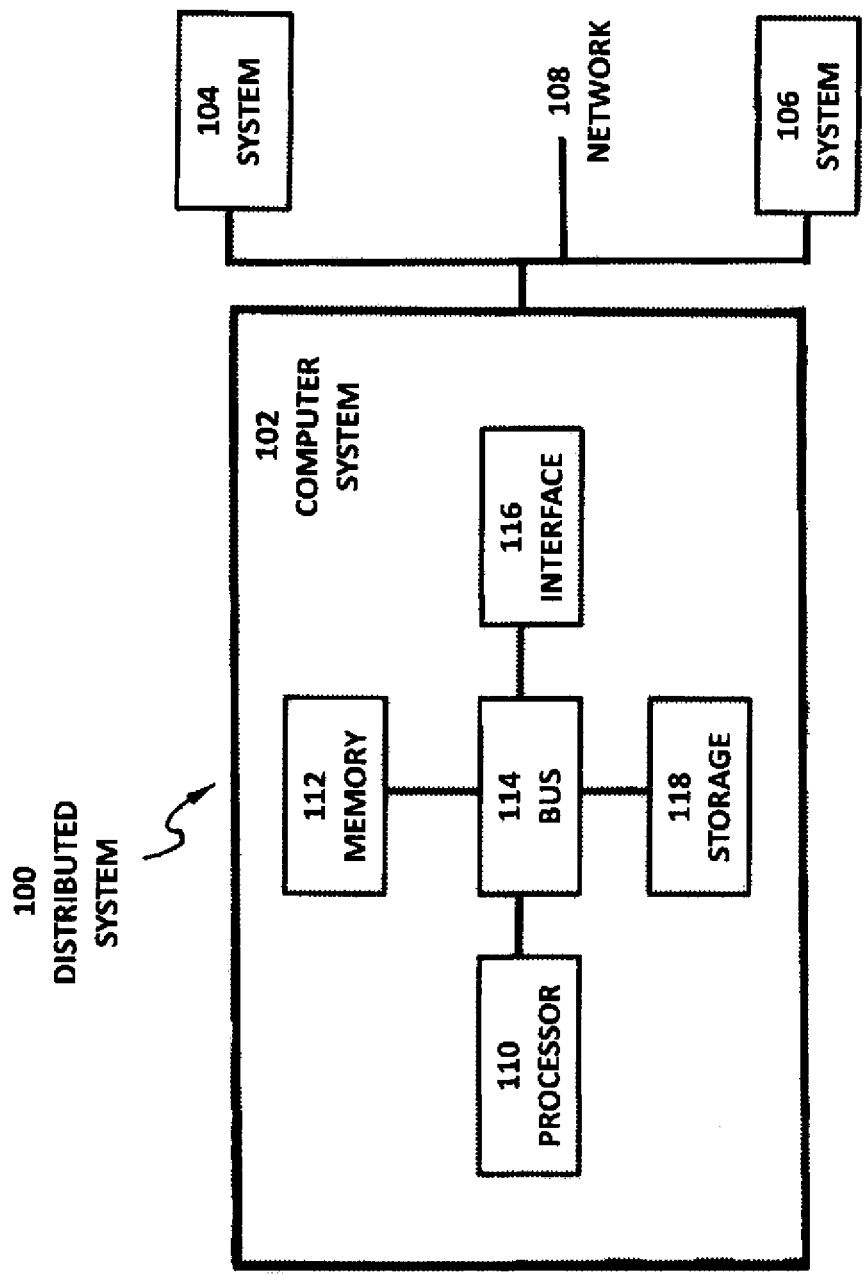

FIG. 4 provides a flow chart of a process 400 for determining the CI for equipment racks of an improper cluster using the corrector model described above in accordance with one embodiment. First at stage 402 of the process 400, information regarding the layout for the improper cluster is loaded into the tool. The information may include power consumption values for each of the racks, cooling capacities of each of the coolers and location of the racks and coolers in the layout. At least some of the information may have previously been stored in a database contained in a computer system implementing the tool transmitted to the computer system via a network or loaded into the system by a user. At stage 404, gaps are identified in the improper cluster, and the gaps (including mismatches at the end of a row) are covered in the layout with blanking panels or replaced with racks having no airflow. The CI for each rack in the improper cluster is then determined (stage 406) using one of a number of techniques as discussed above. As part of stage 406, the Corrector for each rack is determined and applied to the CI. At stage 408, the model is then displayed (and may be printed) with the corrected CI for each of the racks. At stage 410, the process ends. In some embodiments, the displayed model may provide additional indications for out of tolerance CI values, such as warning labels or through the use of color codes. Further, in some embodiments, when an out of tolerance condition is indicated, a user may be prompted to rearrange the racks to find a more satisfactory solution.

In another embodiment, a tool for determining CI for equipment racks in improper hot aisle clusters utilizes an embedded algebraic model. This embedded algebraic model may be included within existing algebraic models (or similar models) for proper clusters or may be implemented as a stand alone tool. One example of an algebraic model with which the embedded algebraic model may be used is described in the '109 and '300 applications referenced above.

In the embedded algebraic model of one embodiment, airflow which passes through gaps is explicitly estimated in order to account for the unfavorable effects of gaps on the CI of each rack. In general, there are two types of airflows through any given gap: an inflow, $Q_{gap\ in}$, and an outflow, $Q_{gap\ out}$. Both "in" and "out" airflows may be simultaneously present in the same gap. The model of airflows used in at least one embodiment of the tool need not have a direct, accurate physical interpretation for the tool to be effective. In other words, if the "in" term computed by the tool is, for example, 375 cfm; it does not mean that the actual inflow through the gap must be 375 cfm for the tool to be effective. Rather, the use of the "in" and "out" flow terms allow for more degrees of freedom in the tool with which the tool may be "tuned." The inflow, $Q_{gap\ in}$, is determined by the cooler airflow rate as well as the distance between all the coolers and the gap. It has been found that the airflow rate which comes in through a gap i in row A into a hot aisle can be adequately represented as shown in Equation (4) below:

$$(Q_{Ai})_{gap\ in} = \sum_{\substack{all\ coolers\ j\ in\ Row\ A \\ all\ j \neq i}} (Q_{Aj})_{cap\ self} \cdot X_1 \cdot e^{-Y_1 \cdot \Delta x(i,j)} +$$
$$X_3 \cdot \sum_{\substack{all\ coolers\ j\ in\ Row\ B \\ all\ j \neq i}} (Q_{Bj})_{cap\ self} \cdot X_1 \cdot e^{-Y_1 \cdot \Delta x(i,j)}$$

Equation (4)

where, $(Q_{Ai})_{gap\ in}$ is the airflow rate that comes in through the gap at location $A_i$ $(Q_{Aj})_{cap\ self}$ is the airflow rate captured by the cooler at location $A_j$ $(Q_{Bj})_{cap\ self}$ is the airflow rate captured by the cooler at location $B_j$ $\Delta x(i,j)$ is the horizontal distance between locations (slots) i and j $X_1$ and $Y_1$ are empirical constants and $X_3$ is the empirical "coupling" constant accounting for effects from the opposite row.

Similarly, the outflow, $Q_{gap\ out}$ can be determined by the rack airflow rate as well as the distance between all the racks and the gap. It has been found that the airflow rate which leaves the hot aisle through a gap i in row A can be adequately represented as:

$$(Q_{Ai})_{gap\ out} = \sum_{\substack{all\ rock\ j\ in\ Row\ A \\ all\ j \neq i}} (Q_{Aj})_{sup\ self} \cdot X_2 \cdot e^{-Y_2 \cdot \Delta x(i,j)} +$$

Equation (5)

-continued
$$Y_3 \cdot \sum_{\substack{all\ rock\ j\ in\ Row\ B \\ all\ j \neq i}} (Q_{Bj})_{sup\ self} \cdot X_2 \cdot e^{-Y_2 \cdot \Delta x(i,j)}$$

where, $(Q_{Ai})_{gap\ out}$ is the airflow rate that leaves through the gap at location $A_i$ $(Q_{Aj})_{sup\ self}$ is the airflow rate supplied by the rack at location $A_j$ $(Q_{Bj})_{sup\ self}$ is the airflow rate supplied by the rack at location $B_j$ $\Delta x(i,j)$ is the horizontal distance between locations (slots) i and j $X_2$ and $Y_2$ are empirical constants and $Y_3$ is the empirical "coupling" constant accounting for effects from the opposite row. The constants are, again, determined by comparing the calculations for a large number of layouts to corresponding "benchmark" cases typically created by CFD simulation. The constants in the model are then adjusted to give the best overall agreement with the benchmark cases based on various metrics including CI.

When calculating the net airflow that can be supplied to a particular location $A_i$ using the current hot-aisle algebraic calculator, the tool accounts for the airflow which escapes the hot aisle through all the gaps. To accomplish this, two extra terms are subtracted from the equation to calculate the $(Q_{Aj})_{cap\ net}$ (from the '109 Application referenced above) one for row A and one for Row B as shown by Equation (6) below:

$$(Q_{Ai})_{cap\ net} =$$
$$(Q_{Ai})_{cap\ self} + \sum_{\substack{all\ j \neq i \\ and\ j\ is\ not\ a\ gap}} (Q_{Aj})_{cap\ self} \cdot A \cdot e^{-B\Delta x(i,j)} -$$
$$\sum_{\substack{all\ j \neq i \\ and\ j\ is\ a\ gap}} (Q_{Aj})_{gap\ out} \cdot X_4 \cdot e^{-Y_4 \cdot \Delta x(i,j)} +$$
$$C \cdot \left\{ (Q_{Bi})_{cap\ self} + \right.$$
$$\sum_{\substack{all\ j \neq i \\ and\ j\ is\ not\ a\ gap}} (Q_{Bj})_{cap\ self} \cdot A \cdot e^{-B\Delta x(i,j)} -$$
$$\left. \sum_{\substack{all\ j \neq i \\ and\ j\ is\ a\ gap}} (Q_{Bj})_{gap\ out} \cdot X_4 \cdot e^{-Y_4 \cdot \Delta x(i,j)} \right\}$$

Equation (6)

where, $(Q_{Ai})_{cap\ net}$ is the net maximum airflow that can be captured at location $A_i$ including contributions from all coolers in the cluster $(Q_{Aj})_{cap\ self}$ is the airflow captured by the cooler at location $A_j$ $(Q_{Bj})_{cap\ self}$ is the airflow captured by the cooler at location $B_j$ $(Q_{Aj})_{gap\ out}$ is the airflow rate that leaves through the gap at location $A_j$ $(Q_{Bj})_{gap\ out}$ is the airflow rate that leaves through the gap at location $B_j$ $\Delta x(i,j)$ is the horizontal distance between locations (slots) i and j A, B, $X_4$, and $Y_4$ are empirical constants C is an empirical "coupling" constant accounting for effects from the opposite row Similarly, the airflow which enters the hot aisle through gaps can also be accounted for by adding two extra terms, $Q_{gap\ in}$ one for row A and one for row B, when calculating the $(Q_{Aj})_{sup\ net}$ as shown by Equation (7) below:

$$(Q_{Ai})_{sup\ net} = (Q_{Ai})_{sup\ self} + \sum_{\substack{all\ j \neq i \\ and\ j\ is\ not\ a\ gap}} (Q_{Aj})_{sup\ self} \cdot E \cdot e^{-F\Delta x(i,j)} + \sum_{\substack{all\ j \neq i \\ and\ j\ is\ a\ gap}} (Q_{Aj})_{gap\ in} \cdot X_5 \cdot e^{-Y_5 \cdot \Delta x(i,j)} + D \cdot \left\{ (Q_{Bi})_{sup\ self} + \sum_{\substack{all\ j \neq i \\ and\ j\ is\ not\ a\ gap}} (Q_{Bj})_{sup\ self} \cdot E \cdot e^{-F\Delta x(i,j)} + \sum_{\substack{all\ j \neq i \\ and\ j\ is\ a\ gap}} (Q_{Bj})_{gap\ in} \cdot X_5 \cdot e^{-Y_5 \cdot \Delta x(i,j)} \right\}$$

Equation (7)

where, $(Q_{Ai})_{sup\ net}$ is the net maximum airflow that can be supplied to location $A_i$ including contributions from all racks in the cluster $(Q_{Aj})_{sup\ self}$ is the airflow supplied by the rack at location $A_j$ $(Q_{Bj})_{sup\ self}$ is the airflow supplied by the rack at location $B_j$ $(Q_{Aj})_{gap\ in}$ is the airflow rate that comes in through the gap at location $A_j$ $(Q_{Bj})_{gap\ in}$ is the airflow rate that comes in through the gap at location $B_j$ $\Delta x(i,j)$ is the horizontal distance between locations (slots) i and j E, F, $X_5$, and $Y_5$ are empirical constants D is an empirical "coupling" constant accounting for effects from the opposite row All the empirical constants can be determined by comparing the calculations for a large number of layouts to corresponding "benchmark" cases typically created by CFD simulation. The constants in the model are then adjusted to give the best overall agreement with the benchmark cases based on various metrics including CI.

In one example, empirical constants are determined as shown in the following table:

TABLE 4

Constants of Imbedded Model for Hot Aisle Clusters

| X1 | 1.000 | Y1 | 12.736 |
|---|---|---|---|
| X2 | 1.000 | Y2 | 2.486 |
| X3 | 10.517 | Y3 | 0.018 |
| X4 | 1.000 | Y4 | 0.019 |
| X5 | 1.000 | Y5 | 8.548 |

The CI is then equal to the ratio of net airflow captured and net airflow supplied at any location expressed as a percentage with values capped at 100%.

In the embodiments above, an embedded algebraic model is provided for determining capture index for equipment racks in the hot aisle of an improper cluster of racks. As readily understood by one of ordinary skill in the art, analogous models may be created for determining the capture index for equipment racks in other layouts including cold aisles with row-based coolers, cold aisles with perforated tiles, and cold aisles with both row-based coolers and perforated tiles.

Using the algebraic method described above, the CI for racks in an improper cluster may be determined. The results of the analysis can then be used to layout equipment in a data center as described above or to rearrange the layout to ensure that specified cooling requirements are met.

In one embodiment, calculations are typically performed for every 6-inch slot along both rows of a cluster so that the tool may be used with standard-width equipment racks; results are averaged over the actual entire rack width before being presented.

In methods of at least one embodiment of the invention, after successful modeling of an improper cluster, the results of the model may be used as part of a system to order equipment, ship equipment and install equipment in a data center.

In at least some embodiments of the invention discussed herein, the performance of assessments and calculations in real-time refers to processes that are completed in a matter of a few seconds or less rather than several minutes or longer as can happen with complex calculations, such as those involving typical CFD calculations.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for evaluating equipment in an improper cluster in a data center, the equipment including a plurality of equipment racks, and at least one cooling provider, the method comprising:
    receiving, by a computer system, data regarding each of the plurality of equipment racks and the at least one cooling provider, the data including a layout of the improper cluster of equipment racks and the at least one cooling provider;
    storing, by the computer system, the received data;
    calculating by the computer system, a modifier value based on characteristics of the improper cluster;
    calculating, by the computer system, a performance metric for the at least one of the plurality of equipment racks based, at least in part, on the modifier value and the characteristics of the improper cluster; and
    displaying, by the computer system, the layout of the data center, wherein the layout includes an indication of the performance metric of the at least one of the plurality of equipment racks.

2. The method of claim 1, further comprising determining an out of tolerance condition based on the performance metric and displaying an indication of the out of tolerance condition in the layout of the data center.

3. The method of claim 1, further comprising identifying at least one gap in the layout, wherein the at least one gap includes at least one of: an unequal-length row in a two row cluster, an opening in the two row cluster, a single row of equipment racks and a break between equipment racks having a predetermined length.

4. The method of claim 3, wherein determining the modifier value includes determining airflow through the at least one gap.

5. The method of claim 4, wherein determining the modifier value includes determining airflow out of an aisle of the improper cluster through the at least one gap, and determining airflow into the aisle through the at least one gap.

6. The method of claim 5, wherein determining the performance metric includes determining net airflow captured in the aisle of the improper cluster and determining net airflow supplied to the aisle of the improper cluster.

7. The method of claim 6, wherein determining the performance metric further includes determining a capture index based on a ratio of the net airflow captured and the net airflow supplied.

8. The method of claim 3, wherein determining the performance metric includes determining a value for a capture index for the at least one of the plurality of equipment racks with each gap in the layout modeled as at least one of at least one blank panel and at least one equipment rack having no airflow.

9. The method of claim 8, further comprising applying the modifier value to the value for the capture index for the at least one of the plurality of equipment racks.

10. The method of claim 1, further comprising arranging the equipment in the data center in accordance the performance metric of the at least one of the plurality of equipment racks.

11. A system for evaluating equipment in an improper cluster in a data center, the equipment including a plurality of equipment racks, and at least one cooling provider, the system comprising:
an interface; and
a controller configured to:
receive data regarding each of the plurality of equipment racks and the at least one cooling provider, the data including a layout of the improper cluster of equipment racks and the at least one cooling provider;
store the received data;
determine a modifier value based on characteristics of the improper cluster;
determine a performance metric for the at least one of the plurality of equipment racks based, at least in part, on the modifier value and the characteristics of the improper cluster; and
display the layout of the data center, wherein the layout includes an indication of the performance metric of the at least one of the plurality of equipment racks.

12. The system of claim 11, wherein the controller is further configured to determine an out of tolerance condition based on the performance metric and displaying an indication of the out of tolerance condition in the layout of the data center.

13. The system of claim 11, wherein the controller is further configured to identify at least one gap in the layout, wherein the at least one gap includes at least one of: an unequal-length row in a two row cluster, an opening in the two row cluster, a single row of equipment racks and a break between equipment racks having a predetermined length.

14. The system of claim 13, wherein the controller is further configured to determine the modifier value by determining airflow through the at least one gap.

15. The system of claim 14, wherein the controller is further configured to determine the modifier value by determining airflow out of an aisle of the improper cluster through the at least one gap, and determining airflow into the aisle through the at least one gap.

16. The system of claim 15, wherein the controller is further configured to determine the performance metric by determining net airflow captured in the aisle of the improper cluster and determining net airflow supplied to the aisle of the improper cluster.

17. The system of claim 16, wherein the controller is further configured to determine the performance metric further by determining a capture index based on a ratio of the net airflow captured and the net airflow supplied.

18. The system of claim 13, wherein the controller is further configured to determine the performance metric by determining a value for a capture index for the at least one of the plurality of equipment racks with each gap in the layout modeled as at least one of at least one blank panel and at least one equipment rack having no airflow.

19. The system of claim 11, further comprising arranging the equipment in the data center in accordance the performance metric of the at least one of the plurality of equipment racks.

20. A non-transitory computer readable medium having stored thereon sequences of instructions including instructions that will cause a processor to:
receive data regarding each of the plurality of equipment racks and the at least one cooling provider, the data including a layout of the improper cluster of equipment racks and the at least one cooling provider;
store the received data;
determine a modifier value based on characteristics of the improper cluster;
determine a performance metric for the at least one of the plurality of equipment racks based, at least in part, on the modifier value and the characteristics of the improper cluster; and
display the layout of the data center, wherein the layout includes an indication of the performance metric of the at least one of the plurality of equipment racks.

* * * * *

UNITED STATES PATENT AND TRADEMARK OFFICE
CERTIFICATE OF CORRECTION

| | | |
|---|---|---|
| PATENT NO. | : 8,554,515 B2 | Page 1 of 2 |
| APPLICATION NO. | : 13/589881 | |
| DATED | : October 8, 2013 | |
| INVENTOR(S) | : VanGilder et al. | |

It is certified that error appears in the above-identified patent and that said Letters Patent is hereby corrected as shown below:

In the Drawings
Fig. 1, should be replaced with the corrected Fig. 1, as shown on the attached page.

Signed and Sealed this
Eleventh Day of February, 2014

Michelle K. Lee
*Deputy Director of the United States Patent and Trademark Office*